Jan. 5, 1960  J. P. WAGNER  2,919,860
THERMOSTATICALLY OPERATED BY-PASS VALVE
Filed Nov. 30, 1956

INVENTOR.
Joseph P. Wagner.
BY
HIS ATTORNEY.

United States Patent Office 2,919,860
Patented Jan. 5, 1960

2,919,860

THERMOSTATICALLY OPERATED BY-PASS VALVE

Joseph P. Wagner, Knoxville, Tenn., assignor to Robertshaw-Fulton Controls Company, Richmond, Va., a corporation of Delaware Application November 30, 1956, Serial No. 625,321

4 Claims. (Cl. 236—34.5)

This invention relates to a thermostatically operated by-pass valve and more particularly to a balanced sleeve-type thermostatically operated by-pass valve used to control the flow of fluid in a plurality of conduits, such as a main conduit and a by-pass conduit in an engine cooling system.

One object of the present invention is to control the flow of fluid in a pair of conduits by means of a hollow valve member that is open at one end thereof and ported at the other end thereof.

Another object of the invention is to control the movement of the valve member by a pressure insensitive thermostat or thermally responsive means in combination with resilient means.

Another object of the invention is to eliminate the effects of fluid pressure differences across the valve member so that the movement of the thermostat of the valve is responsive to fluid temperature changes only.

Another object of the invention is to resiliently connect the valve member to a movable stem which is operatively associated with the thermostat or thermally responsive means.

Another object of the invention is to use a perforated member or spider as a combination supporting means and valve seat.

Another object of the invention is to eliminate the harmful effects of "over-travel" of the thermostat or thermally responsive means.

These and other objects of the present invention will become apparent from the following description taken in connection with the accompanying drawing wherein.

Figure 2:
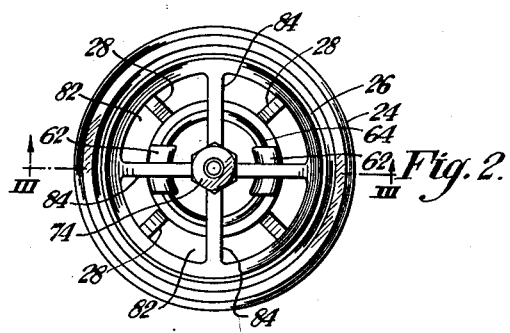
Fig. 2 is a top plan view.
Figure 1:
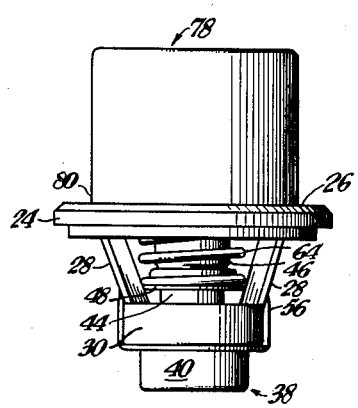
Fig. 1 is a side elevation of the valve.

Referring more particularly to the drawing, the thermostatically operated by-pass valve is shown installed in an internal combustion engine (Figs. 3 and 4) to control the flow of fluid in the cooling system thereof. The engine includes a block 10 (shown cutaway) having a coolant or fluid jacket 12 therein and a head 14 (shown cutaway) having a main fluid conduit 16 and a by-pass fluid conduit 18 therein. The main conduit 16 and the by-pass conduit 18 are disposed substantially in parallel in engine head 14 and are inter-connected by a passage 20 in a wall 21 separating the two conduits.

The thermostatically operated by-pass valve includes a perforated member or spider, generally designated by the reference numeral 22, which is comprised of an annular ring 24 having a valve seat 26 formed thereon and provided with a plurality of integral arms 28 extending obliquely inwardly therefrom. The arms 28 terminate at their inner extremities in an annular, in-turned flange 30 which defines a centrally disposed aperture 32 (Fig. 3) in the spider. The annular ring 24 is adapted to be seated in an annular recess 34 in the engine block 10 and is retained therein by a shoulder 36 on the engine head 14. A compressible gasket 35 is interposed between the block 10 and head 14 to prevent possible fluid leakage therebetween.

The spider 22 supports or carries a pressure insensitive, wax-fusion type thermostat generally designated by the reference numeral 38. The thermostat 38 includes a base or casing 40, a clamping and sealing band 42, a hollow cylindrical member 44, and an extensible and retractible piston 45 which is slidably received in the bore (not shown) of the cylindrical member 44. The casing 40 is filled with a wax-like substance (not shown) which changes from a solid to a liquid at a predetermined temperature and the resultant change in volume thereof produces movement of a diaphragm (not shown) located in the clamping and sealing band 42 which in turn imparts movement to the extensible and retractible piston 45.

The pressure insensitive thermostat 38 is insensitive to static or system pressures within the engine cooling system which are produced by the expansion of the coolant fluid that compresses the air trapped in the system in combination with the actual expansion of the trapped air plus the vapor pressure of the coolant. These static or system pressures when applied to the thermostat piston 45 will be transmitted to the diaphragm and wax-like substance within the thermostat 38, but the wax-like substance is for all practical purposes incompressible. In view of this incompressibility of the wax-like substance, the movement of the thermostat piston 45, therefore, is not affected by static or system pressures or by a change in external loading. Inasmuch as thermostats of this type are well known in the art, further discussion of the structure and function thereof is deemed unnecessary.

The clamping and sealing band 42 of the thermostat 38 is seated on the in-turned flange 30 of the spider 22 whereby the casing 40 of the thermostat projects outwardly of the spider into the main coolant jacket 12. Being so positioned, the wax-like substance in the casing 40 of the thermostat readily reflects any changes in the temperature of the coolant in the jacket 12.

Cylindrical member 44 of thermostat 38 is surrounded by and carries a cylindrical shaped sleeve generally designated by the reference numeral 46. Sleeve 46 terminates at the lower end thereof in a radially out-turned flange 48 and terminates at the upper end thereof in a radially in-turned shoulder 50. Intermediate the ends thereof, sleeve 46 is provided with a plurality of dimples 52 on the inner periphery thereof which are adapted to snugly fit the outer periphery of cylindrical member 44. A stem 54 is rigidly attached to the shoulder 50 of the sleeve 46 and extends substantially axially thereof. The attached end of stem 54 is axially apertured to receive a reduced end of the piston 45 defining a shoulder thereon engaging the shoulder 50.

A strap 56, having a hole 58 in the lower end thereof and provided with a pair of resilient arms 60, is carried by spider 22. The strap is anchored on the in-turned flange 30 on the spider 22 with the hole 58 in the strap registering with the centrally disposed aperture 32 in the spider. The upper extremities of the resilient arms 60 of the strap 56 are reversely bent to provide a hook 62 on the end of each arm. A compression spring 64, having one end thereof seated on the sleeve flange 48 and having the other end thereof seated in the hooks 62 on the upper ends of strap arms 60, holds the aforementioned components of the valve in assembled engagement.

The upper end of sleeve stem 54 is threaded at 66 and is adapted to receive thereon an adjustment member generally designated by the reference numeral 68. The adjustment member 68 is provided with a cylindrical body portion 70 having a threaded axial passage 72 extending therethrough and is provided with a hexagonal shaped head 74 on one end thereof, the head 74 defining a radially extending shoulder 76 that intersects body portion 70. The threaded body passage 72 is adapted to be received on the threaded stem portion 66, and the position of the adjustment member 68 on the threaded stem portion 66 can thereby be varied by rotating the adjustment member in one direction or the other.

A balanced, cylindrical, sleeve valve member, generally designated by the reference numeral 78, is slidably and resiliently retained on the adjustment member 68. At the lower end thereof (viewing Figs. 3 and 4), the valve member 78 is "open" and is provided with an annular end wall 80 thereon which is adapted to move into and out of engagement with the spider valve seat 26, as will be described more in detail hereinafter. At the opposite end thereof, the valve member 78 is provided with a plurality of in this instance four, sector-shaped ports 82 therein (Fig. 2) which define a plurality of inclined and inwardly extending arms 84. The arms 84 terminate at their inner extermities in a centrally disposed circular hub 86 having an aperture 88 extending therethrough.

The valve member 78 is retained on the adjustment member 68 by a compression spring 90 having one end thereof seated on sleeve shoulder 50 and the opposite end thereof seated on the centrally disposed hub 86 of the valve member. The diameter of the aperture 88 in hub 86 is slightly larger than the outer diameter of the cylindrical body portion 70 of the adjustment member 68, and the spring 90, therefore, urges the hub 86 tightly into engagement with the shoulder 76 on adjustment member 68 and thereby holds the valve member 78 in assembled engagement therewith.

Operation

Figure 3:
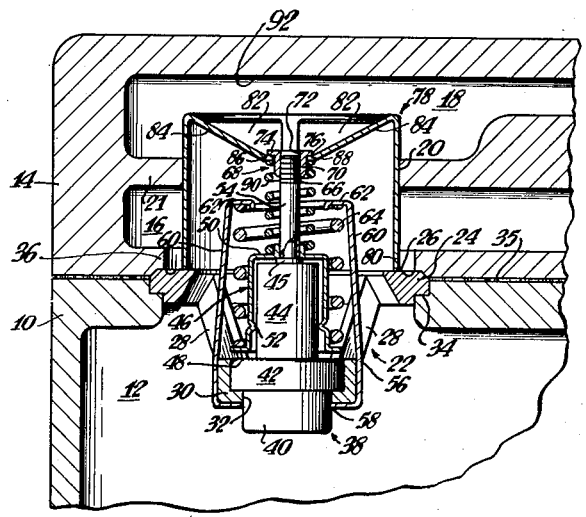
Fig. 3 is a section taken along the line III—III of Fig. 2 with some of the components of the valve shown in elevation and with the valve installed in an engine cooling system.

Referring to Fig. 3, the annular end wall 80 of the valve member 78 is seated on the spider valve seat 26 due to the downward thrust of compression spring 64. In this position of the valve member 78, the total flow of coolant in engine jacket 12 will pass through the interior of the valve member 78 and will be discharged into by-pass conduit 18. The valve member 78 will remain seated on the valve seat 26 as long as the temperature of the coolant in jacket 12 remains below a predetermined minimum degree.

On the other hand, if the temperature of the coolant in jacket 12 rises above the predetermined minimum degree, piston 45 of the thermostat 38 will be extended upwardly (viewing Figs. 3 and 4) and will overcome the thrust of spring 64 to unseat the valve member 78. With the valve member 78 unseated, the coolant in jacket 12 will be discharged into both the by-pass conduit 18 and the main conduit 16.

Figure 4:
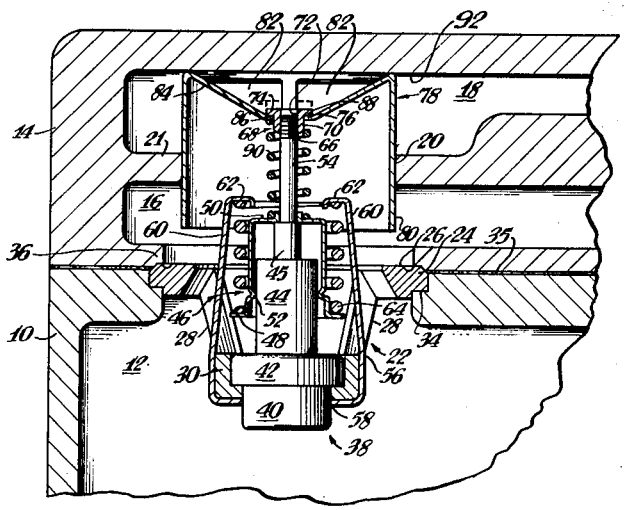
Fig. 4 is a section identical to Fig. 3 with the components of the valve shown in a different controlling position.

If the temperature of the coolant continues to increase and exceeds a predetermined maximum degree, the valve member 78 will be moved into the position shown in Fig. 4. In this position, the upper end of the valve member 78 has been moved into engagement with the upper wall 92 of the by-pass conduit 18 to thereby obstruct the flow of coolant through the interior of the valve member. The total volume of coolant in jacket 12 will now flow around valve member 78 and be discharged into the main conduit 16.

If the temperature of the jacket coolant should continue to increase after the valve member 78 has been moved to the position shown in Fig. 4 and thereby produce an "over-travel" of the thermostat piston 45, the thrust of piston 45 will compress the spring 90 (an overrun spring) and move the stem 54 and the adjustment member 68 to the dotted line position shown in Fig. 4. The use of the overrun spring 90 and the slidable connection between the adjustment member 68 and the valve member hub 86 permits relative movement between the valve member 78 and the stem 54 and thus prevents damage to the various parts of the valve in the event of excessive coolant temperatures in jacket 12.

The calibration adjustment of the valve is effected by rotating adjustment member 68 in one direction or the other to vary the position of the valve member 78 relative to the stem 54. Adjustment member 68 is rotated until the valve member 78 is carried in such a position on stem 54 that the thermostat piston 45 will start to move the valve member end wall 80 away from the valve seat 26 within a predetermined temperature range of the coolant. The calibration adjustment, therefore, determines the coolant temperature at which the valve member 78 will open to permit a flow of coolant into the main fluid conduit 16.

With the valve member 78 being a straight cylindrical member which is "open" at both ends thereof, it will be noted that there are no unbalanced fluid pressure areas on the valve member 78 at either the main fluid conduit 16 or the by-pass fluid conduit 18. Thus, the valve member 78 is balanced or insensitive to fluid pressure differences across the conduits 16 and 18. This balance or fluid pressure insensitivity prevents the valve member 78 from transmitting axial forces to the thermostat 38 as a result of the pressure differences across conduits 16 and 18 whereby the thermostat 38 controls the movement of the valve member 78 only in response to changes in the temperature of the coolant flowing through the valve.

While the present invention has been herein shown and described in connection with the cooling system of an engine, it will be understood that the invention is not to be limited to this particular environmental application. Quite obviously, a thermostatically operated valve constructed in accordance with the present invention can be advantageously utilized in any environmental application wherein it is desirable to use a thermostatically operated valve which is provided with a valve member movable between a pair of opposed valve seats to control the passage of fluid through the interior of the valve member and through a plurality of conduits associated therewith.

Furthermore, while only one embodiment of the present invention has been herein shown and described, it will be apparent to those skilled in the art that the construction and arrangement of parts of the present invention may be variously embodied or changed without departing from the scope of the invention as defined in the appended claims.

It is claimed and desired to secure by Letters Patent:

1. In a thermostatically operated by-pass valve for controlling a flow of fluid to a pair of conduits, the combination comprising a perforated member through which the flow of fluid passes and having a central opening and a valve seat surrounding said opening, a sleeve valve element having an open end cooperating with said valve seat for controlling the flow of fluid to one of the conduits and having a ported end adapted to cooperate with the other of the conduits for controlling the flow of fluid thereto, thermally responsive means including a sleeve element and a piston-stem member, said sleeve element having a flange on one end and a shoulder on an opposite end fastened to said piston-stem member for movement therewith, means connecting said piston-stem member to said valve element for moving the same in response to temperature variations, first spring means having a portion operatively engaging the flange of said sleeve element and being operative between said sleeve element and said perforated member for returning said piston-stem member upon a fluid temperature decrease, and second spring means having a portion operatively engaging the shoulder on said sleeve element and being operative between said sleeve element and said valve member to move said sleeve element relative to said valve member upon an excessive fluid temperature increase.

2. In a thermostatically operated bypass valve for controlling a flow of coolant fluid to a pair of conduits formed in an engine head, the combination comprising a member formed with a circular opening through which the flow of coolant fluid passes and having an annular valve seat surrounding said opening, a sleeve valve element having an annular open end cooperating with said valve seat for controlling the flow of fluid to one of the conduits and having a ported end adapted to cooperate with a portion of the engine head for controlling the flow of fluid to the other conduit, thermally responsive means including a sleeve element and a piston stem member, said sleeve element having a flange on one end and a shoulder on an opposite end fastened to said piston stem member for movement therewith, means connecting said piston stem member to said valve element for moving the same in response to temperature variations, first spring means having a portion operatively engaging said flange of said sleeve element and being operably connected between said sleeve element and said member formed with said circular opening for returning said piston stem member upon a fluid temperature decrease, and second spring means having a portion operatively engaging the shoulder on said sleeve element and being operative to move said sleeve element relative to said valve member upon an excessive fluid temperature increase.

3. In a thermostatically operated bypass valve for controlling a flow of coolant fluid to a main conduit and a bypass conduit formed in an engine head, the combination comprising a member formed with a central opening through which the flow of fluid passes and having a valve seat surrounding said opening, a sleeve valve element movable between positions, said valve element having an open end cooperating with said valve seat when in one position for controlling the flow of fluid to the main conduit and having a ported end adapted to cooperate in another position with a portion of the engine head for controlling the flow of fluid to the bypass conduit, thermally responsive means including a sleeve element and a piston stem member, said sleeve element having a flange on one end and a shoulder on an opposite end fastened to said piston stem member for movement therewith, said piston stem member being operatively connected for moving said valve element between positions in response to temperature variations, first spring means having a portion operatively engaging the flange of said sleeve element and being operative between said sleeve element and said member formed with said central opening for returning said piston stem member upon fluid temperature decrease, and second spring means having a portion operatively engaging the shoulder on said sleeve element and being operative between said sleeve element and said valve member to move said sleeve element relative to said valve member upon an excessive fluid temperature increase.

4. In a thermostatically operated bypass valve for controlling a flow of fluid to a main conduit and a bypass conduit formed in an engine head, the combination comprising a perforated member through which the flow of fluid passes and having a central opening and a valve seat surrounding said opening, a sleeve valve element having an open end and a ported end, said valve element being movable between a first position in which said open end engages said valve seat to cause fluid to flow through the bypass conduit and a second position in which said ported end is seated against the engine head to cause fluid to flow through the main conduit, thermally responsive means including a sleeve element and a piston stem member, said sleeve element having a flange on one end and a shoulder on an opposite end fastened to said piston stem member for movement therewith, means connecting said piston stem member to said valve element for moving the same between said first and second positions in response to temperature variations, said thermally responsive means being operable in response to an increase in the temperature of the fluid above a predetermined value to move said valve element from said first position to said second position, first spring means having a portion operatively engaging the flange of said sleeve element and being operative between said sleeve element and said perforated member for returning said piston stem member upon a fluid temperature decrease and moving said valve element from said second position to said first position, and second spring means having a portion operatively engaging the shoulder on said sleeve element and being operative between said sleeve element and said valve member to move said sleeve element relative to said valve member upon an excessive fluid temperature increase.

References Cited in the file of this patent

UNITED STATES PATENTS

| | | |
|---|---|---|
| 1,752,116 | Smith | Mar. 25, 1930 |
| 1,986,235 | Mayo | Jan. 1, 1935 |
| 2,045,289 | Bolin | June 23, 1936 |
| 2,165,136 | Giesler et al. | July 4, 1939 |
| 2,336,858 | Giesler | Dec. 14, 1943 |
| 2,628,781 | Cantalupo | Feb. 17, 1953 |
| 2,636,776 | Vernet | Apr. 28, 1953 |
| 2,765,983 | Mayo | Oct. 9, 1956 |
| 2,810,523 | Branson | Oct. 22, 1957 |
| 2,810,524 | Puster | Oct. 22, 1957 |